US011817093B2

(12) United States Patent
Alipov et al.

(10) Patent No.: US 11,817,093 B2
(45) Date of Patent: Nov. 14, 2023

(54) METHOD AND SYSTEM FOR PROCESSING USER SPOKEN UTTERANCE

(71) Applicant: YANDEX EUROPE AG, Lucerne (CH)

(72) Inventors: Vyacheslav Vyacheslavovich Alipov, Tomsk (RU); Oleg Aleksandrovich Sadovnikov, Moscow (RU); Nikita Vladimirovich Zubkov, g Ivanovo (RU)

(73) Assignee: YANDEX EUROPE AG, Lucerne (CH)

( * ) Notice: Subject to any disclaimer, the term of this patent is extended or adjusted under 35 U.S.C. 154(b) by 269 days.

(21) Appl. No.: 17/114,059

(22) Filed: Dec. 7, 2020

(65) Prior Publication Data

US 2021/0193141 A1 Jun. 24, 2021

(30) Foreign Application Priority Data

Dec. 24, 2019 (RU) ............................ RU2019143604

(51) Int. Cl.
*G10L 15/30* (2013.01)
*G10L 15/22* (2006.01)

(52) U.S. Cl.
CPC ........ *G10L 15/22* (2013.01); *G10L 2015/223* (2013.01); *G10L 2015/228* (2013.01)

(58) Field of Classification Search
None
See application file for complete search history.

(56) References Cited

U.S. PATENT DOCUMENTS 6,856,957 B1 2/2005 Dumoulin
7,031,915 B2 4/2006 Baker et al.
(Continued)

FOREIGN PATENT DOCUMENTS

RU 2646350 C2 3/2018

OTHER PUBLICATIONS

Sohini, "A Bandit Approach to Posterior Dialog Orchestration Under a Budget", IBM Research AI, 32nd Conference on Neural Information Processing Systems (NeurIPS 2018), Montréal, Canada.
(Continued)

*Primary Examiner* — Seong-Ah A Shin
(74) *Attorney, Agent, or Firm* — BCF LLP

(57) ABSTRACT

There is disclosed a method and system for processing a user spoken utterance, the method comprising: receiving, from a user, an indication of the user spoken utterance; generating, a text representation hypothesis based on the user spoken utterance; processing, using a first trained scenario model and a second trained scenario model, the text representation hypothesis to generate a first scenario hypothesis and a second scenario hypothesis, respectively; the first trained scenario model and the second trained scenario model having been trained using at least partially different corpus of texts; analyzing, using a Machine Learning Algorithm (MLA), the first scenario hypothesis and the second scenario hypothesis to determine a winning scenario having a higher confidence score; based on the winning scenario, determining by an associated one of the first trained scenario model and the second trained scenario model, an action to be executed by the electronic device; executing the action.

18 Claims, 6 Drawing Sheets

(56) References Cited

U.S. PATENT DOCUMENTS

| | | | |
|---|---|---|---|
| 8,140,328 B2 | 3/2012 | Williams | |
| 8,862,467 B1 | 10/2014 | Casado et al. | |
| 9,378,742 B2 | 6/2016 | Kim | |
| 9,484,021 B1 | 11/2016 | Mairesse et al. | |
| 9,764,477 B2 | 9/2017 | Stoyanchev et al. | |
| 9,779,724 B2 | 10/2017 | Gruenstein et al. | |
| 10,162,813 B2 | 12/2018 | Sarikaya et al. | |
| 10,229,683 B2 | 3/2019 | Leeb | |
| 10,283,111 B1 | 5/2019 | Mairesse et al. | |
| 10,339,916 B2 | 7/2019 | Sarikaya et al. | |
| 11,410,646 B1* | 8/2022 | Erbas | G10L 15/1822 |
| 2004/0230420 A1* | 11/2004 | Kadambe | G10L 15/07 |
| | | | 704/E15.011 |
| 2014/0222436 A1 | 8/2014 | Binder et al. | |
| 2015/0348551 A1* | 12/2015 | Gruber | G10L 15/1822 |
| | | | 704/235 |
| 2015/0382047 A1* | 12/2015 | Van Os | H04N 21/4316 |
| | | | 725/38 |
| 2016/0071521 A1 | 3/2016 | Haughay | |
| 2017/0230709 A1 | 8/2017 | Van Os et al. | |
| 2018/0190272 A1 | 7/2018 | Georges et al. | |
| 2018/0260680 A1* | 9/2018 | Finkelstein | G06N 5/04 |
| 2019/0279617 A1 | 9/2019 | Stahl et al. | |
| 2020/0257943 A1* | 8/2020 | Huber | G06N 7/01 |

OTHER PUBLICATIONS

Russian Search report dated Aug. 24, 2021 in respect of the counterpart Russian Patent Application RU 2019143604.

\* cited by examiner

METHOD AND SYSTEM FOR PROCESSING USER SPOKEN UTTERANCE

CROSS-REFERENCE

The present application claims priority to Russian Patent Application No. 2019143604, entitled "Method and system for processing user spoken utterance", filed Dec. 24, 2019, the entirety of which is incorporated herein by reference.

FIELD

The present technology relates to natural language processing in general and specifically to a method and a system for processing a user spoken utterance.

BACKGROUND

Electronic devices, such as smartphones and tablets, are able to access an increasing and diverse number of applications and services for processing and/or accessing different types of information. However, novice users and/or impaired users and/or users operating a vehicle may not be able to effectively interface with such devices mainly due to the variety of functions provided by these devices or the inability to use the machine-user interfaces provided by such devices (such as a key board). For example, a user who is driving or a user who is visually-impaired may not be able to use the touch screen key board associated with some of these devices.

Virtual assistant applications have been developed to perform functions in response to user requests. Such virtual assistant applications may be used, for example, for information retrieval, navigation, but also a wide variety of requests. A conventional virtual assistant application, such as Siri™ for example, can receive a spoken user utterance in a form of digital audio signal from a device and perform a large variety of tasks for the user. For example, a user can communicate with Siri® by providing spoken utterances for asking, for example, what the current weather is, where the nearest shopping mall is, and the like. The user can also ask for the execution of various applications installed on the electronic device.

Generally speaking, conventional virtual assistant applications are trained to generate plurality of hypotheses based on an utterance and select the most likely hypothesis as the correct textual representation of the utterance by based on phrases that it has been previously trained on.

The article entitled "*A Bandit Approach to Posterior Dialog Orchestration Under a Budget*" published in the $32^{nd}$ Conference on Neural Information Processing Systems (NeurIPS 2018) by Sohini Upadhyay et al. investigates the task of online posterior dialog orchestration, where posterior orchestration is defined as the task of selecting a subset of skills which most appropriately answer a user input using features extracted from both the user input ad the individual skills.

U.S. Pat. No. 9,484,021 B1 issued on Nov. 1, 2016 to Amazon Technologies, Inc., and titled "Disambiguation in Speech Recognition" teaches an automatic speech recognition (ASR) processing including a two-stage configuration. After ASR processing of an incoming utterance where the ASR outputs an N-best list including multiple hypotheses, a first stage determines whether to execute a command associated with one of the hypotheses or whether to output some of the hypotheses of the N-best list for disambiguation. A second stage determines what hypotheses should be included in the disambiguation choices. A first machine learning model is used at the first stage and a second machine learning model is used at the second stage. The multi-stage configuration allows for reduced speech processing errors as well as a reduced number of utterances sent for disambiguation, which thus improves the user experience.

United States Patent Application Publication No. 2019/0279617 A1 published Sep. 12, 2019 to SoundHound, Inc., and titled "Voice Characterization-Based Natural Language Filtering", teaches determining a characteristic of the utterance and a transcription hypothesis is generated for the utterance. Grammar rules are then used to parse the transcription hypothesis to produce a plurality of interpretation hypotheses, each having a likelihood score. A set of authorized domains is determined based on the characteristic and the plurality of interpretation hypotheses are filtered according to the set of authorized domains. Of the remaining interpretation hypotheses, one is selected according to their likelihood scores. The characteristic may include one or more characteristics such as mood, prosody, or whether the utterance has a rising intonation.

U.S. Pat. No. 10,229,683 B2 issued on Mar. 12, 2019 to SoundHound, Inc., and titled "Speech-Enabled System with Domain Disambiguation", teaches methods of interpreting spoken utterances from a user and responding to the utterances by providing requested information or performing a requested action. The utterances are interpreted in the context of multiple domains. Each interpretation is assigned a relevancy score based on how well the interpretation represents what the speaker intended. Interpretations having a relevancy score below a threshold for its associated domain are discarded. A remaining interpretation is chosen based on choosing the most relevant domain for the utterance. The user may be prompted to provide disambiguation information that can be used to choose the best domain. Storing past associations of utterance representation and domain choice allows for measuring the strength of correlation between uttered words and phrases with relevant domains. This correlation strength information may allow the system to automatically disambiguate alternate interpretations without requiring user input.

U.S. Pat. No. 10,339,916 B2 issued on Jul. 2, 2019 to Microsoft Technology Licensing, LLC, and titled "Generation and Application of Universal Hypothesis Ranking Model" describes generation and application of a universal hypothesis ranking model to rank/re-re-rank dialog hypotheses. An input is received through a user interface of an application for dialog processing. A plurality of dialog hypotheses are generated based on input understanding processing of the received input. The plurality of dialog hypotheses are ranked using a universal hypothesis ranking model that is applicable to a plurality of languages and locales. The ranking of the plurality of dialog hypotheses comprises using the universal hypothesis ranking model to analyze language independent features of the plurality of dialog hypotheses for policy determination. Other examples are also described including examples directed to generation of the universal hypothesis ranking model.

SUMMARY

It is an object of the present technology to ameliorate at least some of the inconveniences present in the prior art.

In accordance with a broad aspect of the present technology, there is provided a computer-implemented method for processing a user spoken utterance, the method being executable by an electronic device, the method comprising: receiving, by the electronic device from a user, an indication of the user spoken utterance; generating, by the electronic device, a text representation hypothesis based on the user spoken utterance; processing, by the electronic device, using a first trained scenario model and a second trained scenario model, the text representation hypothesis to generate a first scenario hypothesis and a second scenario hypothesis, respectively; the first trained scenario model and the second trained scenario model having been trained using at least partially different corpus of texts; analyzing, by the electronic device, using a Machine Learning Algorithm (MLA), the first scenario hypothesis and the second scenario hypothesis to determine a winning scenario having a higher confidence score; based on the winning scenario, determining by an associated one of the first trained scenario model and the second trained scenario model, an action to be executed by the electronic device; executing, by the electronic device, the action.

In some non-limiting embodiments of the method, the first trained scenario model and the second scenario models are part of a plurality of trained scenario models, each one of the plurality of trained scenario models having been trained using at least partially different corpus of text.

In some non-limiting embodiments of the method, the at least partially different corpus of text has been selected based on an intent of an associated one of the plurality of trained scenario models.

In some non-limiting embodiments of the method, the processing the text representation hypothesis to generate the first scenario hypothesis and the second scenario hypothesis is executed without triggering the electronic device to execute the action.

In some non-limiting embodiments of the method, the processing the text representation hypothesis to generate the first scenario hypothesis and the second scenario hypothesis is executed by sending the text representation hypothesis to the first trained model scenario model and the second trained scenario model, and receiving the first scenario hypothesis and the second scenario hypothesis in response thereto.

In some non-limiting embodiments of the method, the receiving a given one of the first scenario hypothesis and the second scenario hypothesis comprises receiving one of: an answer-based response; a commit response; and a postponed response.

In some non-limiting embodiments of the method, in response to the winning scenario being associated with the answer-based response, the executing the action comprises providing the answer-based response to the user.

In some non-limiting embodiments of the method, the providing the answer-based response comprises at least one of providing an audio representative of the answer-based response and a graphical representation of the answer-based response.

In some non-limiting embodiments of the method, in response to the winning scenario being associated with the one of the commit response and the postponed response, the determining the action comprises re-sending the text representation hypothesis to an associated one of the first trained scenario model and the second trained scenario model.

In some non-limiting embodiments of the method, response to the winning scenario being associated with the one of the commit response and the postponed response, the determining the action comprises sending an associated one of the first scenario hypothesis and the second scenario hypothesis that is the winning scenario to an associated one of the first trained scenario model and the second trained scenario model.

In some non-limiting embodiments of the method, the executing the action comprises triggering an application executable by the electronic device.

In some non-limiting embodiments of the method, further comprising providing to the user an indication of the action to be executed by the application.

In some non-limiting embodiments of the method, the application is configured to execute a side electronic service.

In some non-limiting embodiments of the method, the application is configured to trigger operation of an external electronic device.

In some non-limiting embodiments of the method, the executing the action is executed in response to the user providing a confirmation of the action.

In some non-limiting embodiments of the method, the MLA is a classifier.

In some non-limiting embodiments of the method, further comprising training the MLA.

In some non-limiting embodiments of the method, training the MLA comprises: generating a training set including a training object an a label; the training object including a training scenario; the label including a suitability parameter for each of the first trained scenario model and the second scenario model, the suitability parameter indicative of the suitability of a respective one of the first trained scenario model and the second scenario model for handling the training scenario.

In some non-limiting embodiments of the method, the method further comprises receiving an indication of the label from a human assessor.

In some non-limiting embodiments of the method, the electronic device comprises a smart speaker.

In some non-limiting embodiments of the method, the user spoken utterance is expressed in a natural language.

In some non-limiting embodiments of the method, the generating, by the electronic device, the text representation hypothesis based on the user spoken utterance comprises executing a Natural Language Processing (NLP) algorithm.

In some non-limiting embodiments of the method, the wining scenario is a plurality of winning scenarios and wherein the action is a plurality of actions.

In some non-limiting embodiments of the method, the executing the action comprises executing the plurality of actions substantially simultaneously.

In some non-limiting embodiments of the method, the executing the action comprises executing the plurality of actions one after another.

In some non-limiting embodiments of the method, the executing the plurality of actions comprises triggering operation of one or more external electronic devices.

In some non-limiting embodiments of the method, the one or more external electronic devices are one or more connected home type electronic devices.

In accordance with another broad aspect of the present technology, there is disclosed a system for processing a user spoken utterance, the system comprising an electronic device, the electronic device comprising a processor configured to: receive, an indication of the user spoken utterance from a user; generate, a text representation hypothesis based on the user spoken utterance; process, using a first trained scenario model and a second trained scenario model, the text representation hypothesis to generate a first scenario hypothesis and a second scenario hypothesis, respectively; the first trained scenario model and the second trained scenario model having been trained using at least partially different corpus of texts; analyze, using a Machine Learning Algorithm (MLA), the first scenario hypothesis and the second scenario hypothesis to determine a winning scenario having a higher confidence score; based on the winning scenario, determine by an associated one of the first trained scenario model and the second trained scenario model, an action to be executed by the electronic device; execute the action.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
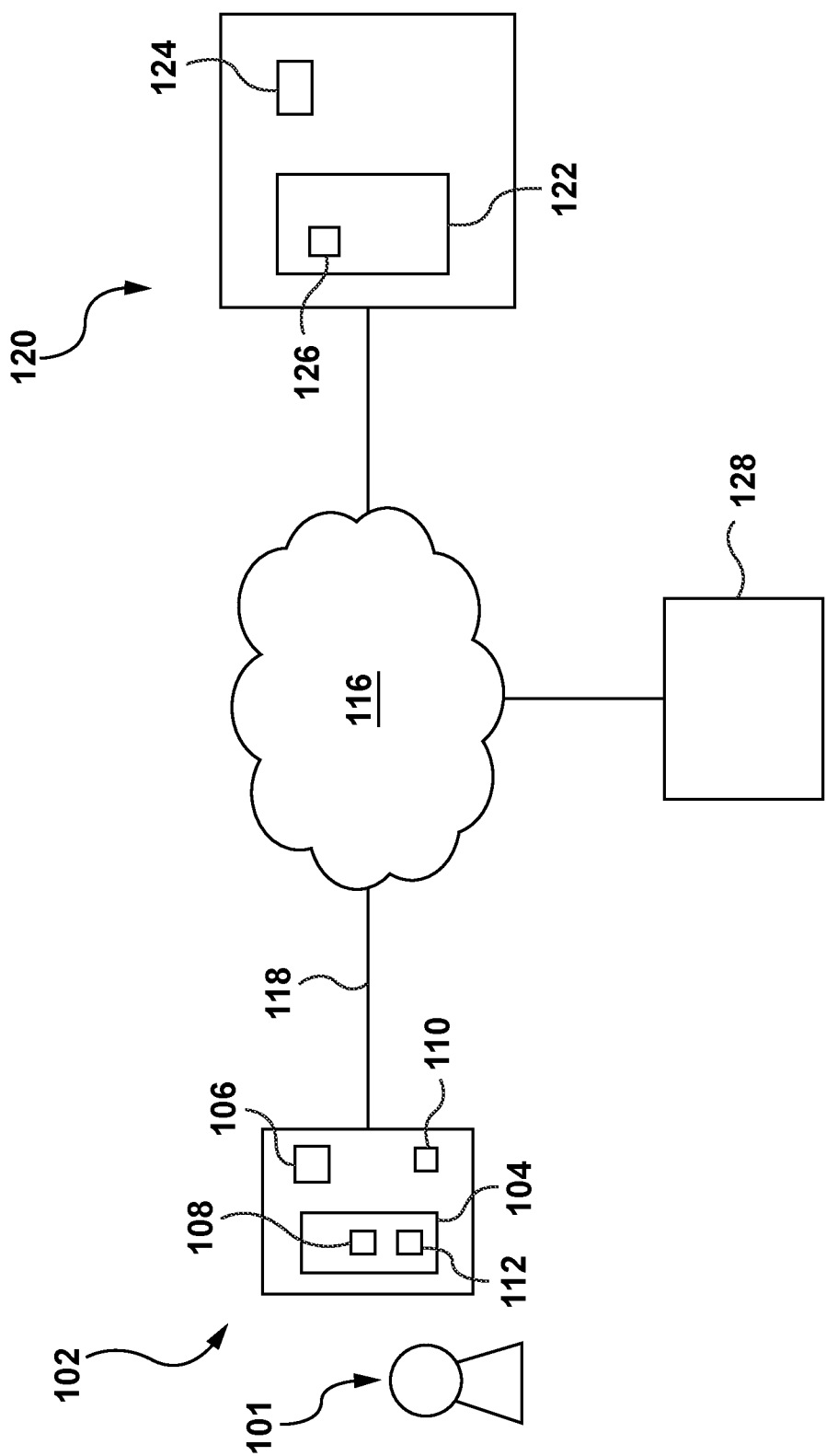
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is associated with a user 101 and, as such, can sometimes be referred to as a "client device". It should be noted that the fact that the electronic device 102 is associated with the user 101 does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, tablets, and smart speakers (such as for example, Yandex.Station™ provided by Yandex LLC of Lev Tolstoy Street, No. 16, Moscow, 119021, Russia). It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof) to execute a virtual assistant application 108. Generally speaking, the virtual assistant application 108 is capable of hands-free activation in response to one or more "hot words" (also known as "trigger words"), and able to perform tasks or services in response to a command received by the user 101. For example, the virtual assistant application 108 may be implemented as an ALICE digital assistant (provided by Yandex LLC of Lev Tolstoy Street, No. 16, Moscow, 119021, Russia) on a smartphone, or other commercial or proprietary virtual assistant applications. As such, the electronic device 102 may receive a command via a microphone 110 implemented within the electronic device 102. In some non-limiting embodiments of the present technology, the microphone 110 is a stand-alone device communicatively coupled with the electronic device 102.

Generally speaking, the virtual assistant application 108 comprises (or otherwise has access to) an analog-to-digital converter (not shown), configured to convert the command, in the form of an analog signal received by the microphone 110 from the user 101, into a digital signal.

The electronic device 102 further comprises hardware and/or software and/or firmware (or a combination thereof) to execute one or more service applications 112. Generally speaking, the one or more service applications 112 correspond to electronic applications accessible by the electronic device 102. In some non-limiting embodiments of the present technology, the one or more service applications 112 comprise at least one service application (not numbered) that is operated by the same entity that has provided the aforedescribed virtual assistant application 108. For example, if the virtual assistant application 108 is the ALICE digital assistant, the one or more service applications 112 may include a Yandex.Browser™ web browser application, a Yandex.News™ news application, a Yandex.Market™ market application, and the like. Needless to say, the one or more service applications 112 may also include service applications that are not operated by the same entity that has provided the afore-mentioned virtual assistant application 108, and may comprise for example, social media applications such as Vkontakte™ social media application, and music streaming application such as Spotify™ music streaming application. In some non-limiting embodiments of the present technology, the one or more service applications 112 may include a side electronic service, such as an application for dialogues (such as Yandex.Dialogs™), an application for ordering a taxi, an application for ordering food, and the like. In some non-limiting embodiments of the present technology, the one or more service applications 112 may be associated with one or more electronic devices linked to the electronic device 102 (described in more detail below).

In some non-limiting embodiments of the present technology, the electronic device 102 is implemented as a smart device, such as a Yandex.Station™. When implemented as a smart device, it is contemplated that a client device, such as a smart phone (not illustrated), associated with the user 101 is synced with the electronic device 102.

The electronic device 102 comprises a communication interface (not depicted) for enabling two-way communication with a communication network 116 via a communication link 118. In some non-limiting embodiments of the present technology, the communication network 116 can be implemented as the Internet. In other embodiments of the present technology, the communication network 116 can be implemented differently, such as any wide-area communication network, local area communications network, a private communications network and the like.

How the communication link 118 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 118 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 118 and the communication network 116 are provided for illustration purposes only. As such, those skilled in the art will easily appreciate other specific implementational details for the electronic device 102, the communication link 118, and the communication network 116. As such, by no means the examples provided hereinabove are meant to limit the scope of the present technology.

The system 100 further includes a server 120 coupled to the communication network 116. The server 120 can be implemented as a computer server. In an example of an embodiment of the present technology, the server 120 can be implemented as a Dell™ PowerEdge™ Server running the Microsoft™ Windows Server™ operating system. Needless to say, the server 120 can be implemented in any other suitable hardware and/or software and/or firmware or a combination thereof. In the depicted non-limiting embodiment of the present technology, the server 120 is a single server. In alternative non-limiting embodiments of the present technology, the functionality of the server 120 may be distributed and may be implemented via multiple servers.

The server 120 comprises a communication interface (not depicted) structured and configured to communicate with various entities (such as the electronic device 102 and other devices potentially coupled to the communication network 116) via the communication network 116. The server 120 comprises a server memory 122, which comprises one or more storage media and generally provides a place to store computer-executable program instructions executable by a server processor 124. By way of example, the server memory 122 may be implemented as a tangible computer-readable storage medium including Read-Only Memory (ROM) and/or Random-Access Memory (RAM). The server memory 122 may also include one or more fixed storage devices in the form of, by way of example, hard disk drives (HDDs), solid-state drives (SSDs), and flash-memory cards.

In some non-limiting embodiments of the present technology, the server 120 can be operated by the same entity that has provided the afore-described virtual assistant application 108. For example, if the virtual assistant application 108 is an ALICE digital assistant, the server 120 can also be operated by Yandex LLC of Lev Tolstoy Street, No. 16, Moscow, 119021, Russia. In alternative embodiments, the server 120 can be operated by an entity different from the one that has provided the aforementioned virtual assistant application 108.

In some non-limiting embodiments of the present technology, the server 120 is configured to execute an automated speech recognition application 126 (the "ASR application 126" for short). The manner in which the ASR application 126 is implemented will be described in detail below.

In some non-limiting embodiments of the present technology, the system 100 further includes a second electronic device 128 coupled to the communication network 116. In some non-limiting embodiments of the present technology, the second electronic device 128 is a connected homeware device, such as a television, lamp, stereo and the like, configured to execute an instruction received by the electronic device 102. As such, it is contemplated that the second electronic device 128 be in direct communication with the electronic device 102, without being coupled to the communication network 116.

ASR Application 126

Figure 2:
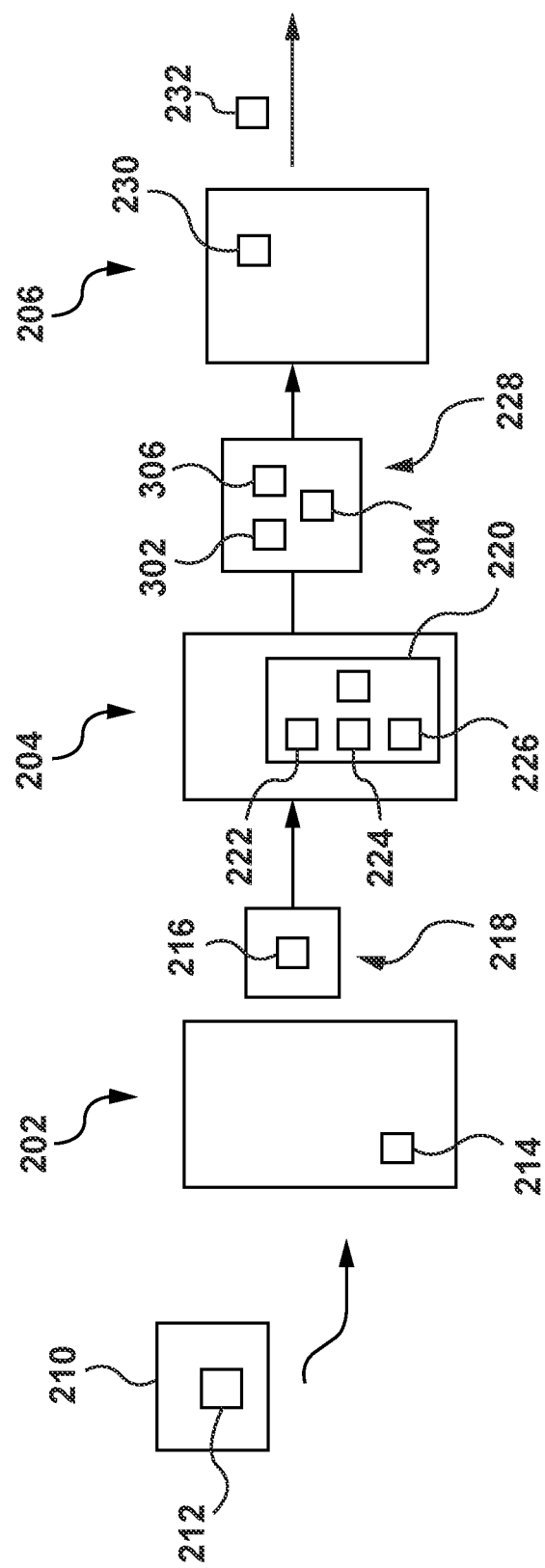
FIG. 2 depicts an example process for determining a response to a user spoken utterance.

With reference to FIG. 2, there is depicted a schematic illustration of the ASR application 126 implemented in accordance with a non-limiting embodiment of the present technology. The ASR application 126 executes (or otherwise has access to): a receiving routine 202, a hypothesis generating routine 204, and a ranking routine 206.

In the context of the present specification, the term "routine" refers to a subset of the computer executable program instructions of the ASR application 126 that is executable by the server processor 124 to perform the functions explained below in association with various routines (the receiving routine 202, the hypothesis generating routine 204, and the ranking routine 206). For the avoidance of any doubt, it should be expressly understood that the receiving routine 202, the hypothesis generating routine 204, and the ranking routine 206 are illustrated schematically herein as separate entities for ease of explanation of the processes executed by the ASR application 126. It is contemplated that some or all of the receiving routine 202, the hypothesis generating routine 204, and the ranking routine 206 may be implemented as one or more combined routines.

For ease of understanding the present technology, functionality of each one of the receiving routine 202, the hypothesis generating routine 204, ranking routine 206, and the output routine 208, as well as data and/or information processed or stored therein are described below.

Receiving Routine 202

The receiving routine 202 is configured to receive a data packet 210 from the virtual assistant application 108. For example, the data packet 210 comprises an utterance 212 of the user 101 expressed in a natural language.

The manner in which the data packet 210 is transmitted by the virtual assistant application 108 is not limited, and may for example be in response to the user 101 uttering a command to the virtual assistant application 108. In other words, the virtual assistant application 108 can be in an "always listen" mode or can "wake up" in response to a pre-determined user spoken utterance. The utterance 212 is transmitted as a digital signal, following a conversion from an analog signal via the analog-to-digital converter.

In some non-limiting embodiments of the present technology, the receiving routine 202 is configured to execute a natural language processing (NLP) algorithm 214. How the NLP algorithm 214 is implemented is not limited. For example, the NLP algorithm 214 may be based on Latent Semantic Analysis (LSA), Probabilistic Latent Semantic Analysis (pLSA), Word2vec, Global Vectors for Word Representation (GloVe), or Latent Dirichlet Allocation (LDA).

In response to receiving the data packet 210, the receiving routine 202 is configured to execute the NLP algorithm 214 to generate a text representation hypothesis 216 of the utterance 212. The receiving routine 202 is then configured to transmit a data packet 218 to the hypothesis generating routine 204. The data packet 218 comprises the text representation hypothesis 216.

Hypothesis Generating Routine 204

In response to receiving the data packet 218, the hypothesis generating routine 204 is configured to execute the following functions.

First, the hypothesis generating routine 204 is configured to input the text representation hypothesis 216 to a plurality of scenario models 220, which comprises at least a first scenario model 222, a second scenario model 224 and a third scenario model 226. Needless to say, the plurality of scenario models 220 may include more than three scenario models, or only two scenario models.

In some non-limiting embodiments of the present technology, each of the first scenario model 222, the second scenario model 224 and the third scenario model 226 is configured to analyze the text representation hypothesis 216 and populate one or more fields of a specific scenario with one or more words in the text representation hypothesis 216. More precisely, the hypothesis generating routine 204 is configured to identify any action-related words of a specific topic or intent within the text representation hypothesis 216 and generate a respective scenario hypothesis (described in detail below).

For example, the first scenario model 222 may be associated with one or more keyword fields associated with transportation commands. As such, the first scenario model 222 is configured to identify and populate the one or more keyword fields with one or more words in the text representation hypothesis 216. For example, the one or more keyword fields associated with the transportation commands may include "to", "from", "call", and the first scenario model 222 is configured to identify one or more words in the text representation hypothesis 216 that is semantically associated with the one or more keyword fields. How the first scenario model 222 is configured to identify and populate the one or more keyword fields is not limited. For example, the first scenario model 222 is trained using a corpus of text associated with a particular intent, namely a first corpus of text comprising transport-related keywords for each of the one more keyword fields.

In another example, the second scenario model 224 may be associated with one or more keyword fields associated homeware related commands. For example, assuming that the second electronic device 128 (see FIG. 1) is a smart lamp that is synced with the electronic device 102, the second scenario model 224 is associated with one or more keyword fields associated with smart lamp related commands. The one or more keyword fields associated with the smart lamp related commands may include "action" and "subject", and the second scenario model 224 is configured to identify one or more words in the text representation hypothesis 216 that is semantically associated. How the second scenario model 224 is configured to identify and populate the one or more keyword fields is not limited. For example, the second scenario model 224 is trained using a corpus of text associated with a particular intent, namely a second corpus of text comprising smart lamp related keywords for each of the one or more keyword fields.

Similarly, the third scenario model 226 may be associated with one or more keyword fields associated with music related commands. As such, the third scenario model 226 is configured to identify and populate the one or more keyword fields with one or more words in the text representation hypothesis 216. For example, the one or more keyword fields associated with the music related commands may include "action" and "subject", and the third scenario model 226 is configured to identify one or more words in the text representation hypothesis 216 that is semantically associated with the one or more keyword fields. How the third scenario model 226 is configured to identify and populate the one or more keyword fields is not limited. For example, the third scenario model 226 is trained using a corpus of text associated with a particular intent, namely a third corpus of text comprising music related keywords for each of the one or more keyword fields.

Figure 3:
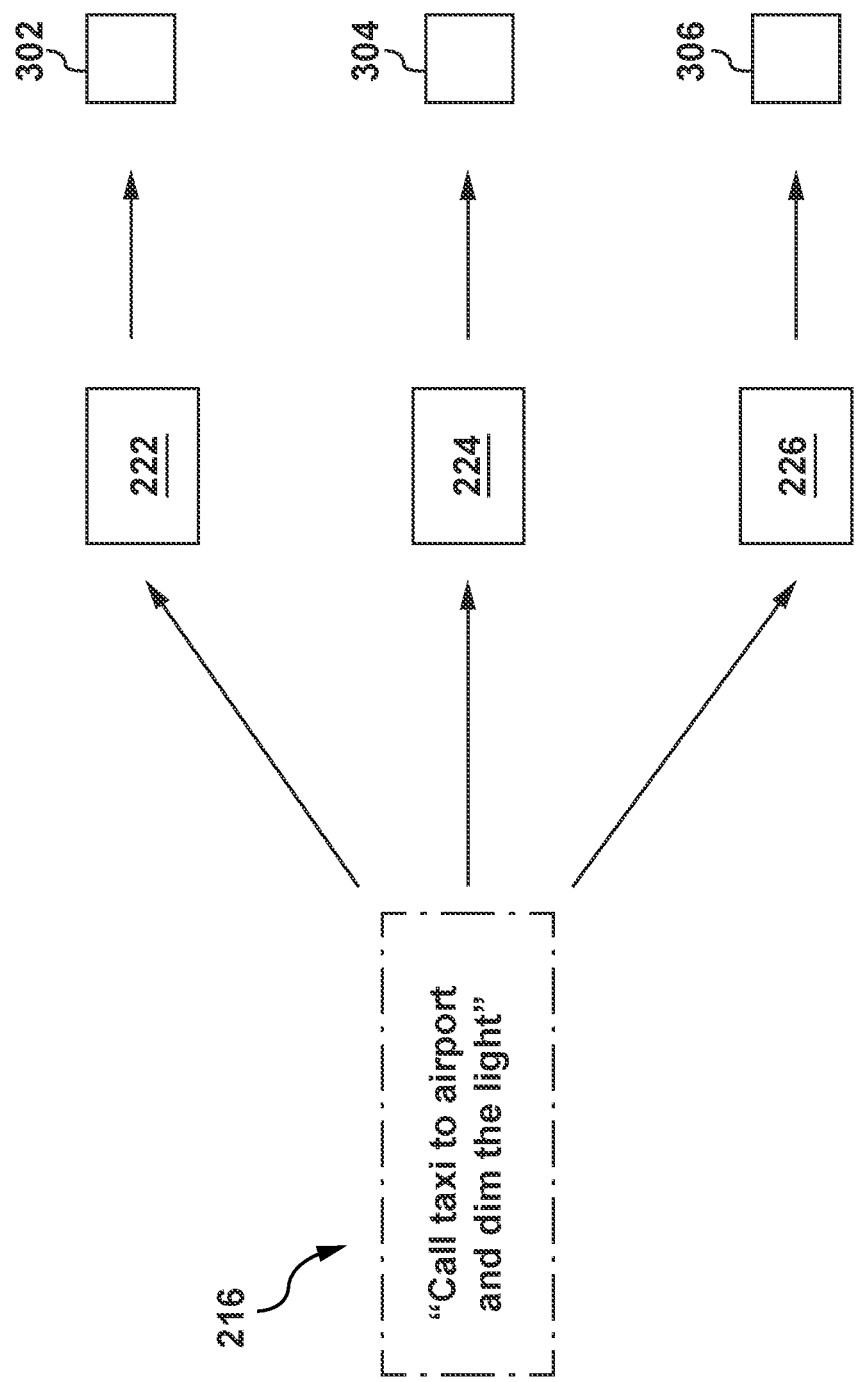
FIG. 3 depicts an example process for generating scenario hypothesis, executed as part of the process of FIG. 2.

Referring to FIG. 3, a schematic illustration of a process to generate the scenario hypothesis is depicted.

Let us assume for example, that the text representation hypothesis 216 corresponds to "Call taxi to airport and dim the light".

The text representation hypothesis 216 is transmitted to the first scenario model 222, the second scenario model 224 and the third scenario model 226.

In some non-limiting embodiments of the present technology, in response to receiving the text representation hypothesis 216, each of the first scenario model 222, the second scenario model 224 and the third scenario model 226 is configured to generate a respective scenario hypothesis (discussed in more detail below). In some non-limiting embodiments of the present technology, the scenario hypothesis may correspond to one of: (i) an answer-based response; (ii) a commit response; (iii) a postponed response; and (iv) a null response.

For example, the answer-based response may correspond to identifying an announcement to be made by the electronic device 102 which comprises a response to a question contained in the text representation hypothesis 216. For example, if the text representation hypothesis 216 included a query "what is the weather today" instead of "call taxi to airport and dim the light", an example of an answer-based response may correspond to the electronic device 102 identifying the weather without actually triggering the electronic device 102 to announce it.

On the other hand, the commit response may correspond to executing an action associated with the text representation hypothesis 216. The action can be playing a song, turning on an application, ordering a taxi, turning on lights, turning off a Television, or the like. In some embodiments of the present technology, the executing the action may additionally include generating an announcement by the electronic device 102 that it will execute a particular action before executing the action. It is noted that at this stage of the process the commit response included an indication of the action to be executed, but without actually triggering the electronic device 102 to execute the action (described in more detail below).

A postponed response may be generated when the processing of the text representation hypothesis 216 cannot be completed without launching a side application. For example, if the text representation hypothesis 216 included "how are you Alice™?" instead of "call taxi to airport and dim the light", the postponed response may correspond to launching a side application (such as Yandex.Dialog™), and processing the text representation hypothesis 216.

Finally, a null response may correspond to identifying that the text representation hypothesis 216 cannot be processed by a given scenario model.

Now, in response to receiving the text representation hypothesis 216, the first scenario model 222 is configured analyze the text representation hypothesis 216 and populate the one or more keyword fields associated with the transportation commands. Let us assume that the first scenario model 222 has populated the one or more keyword fields as follows—"to—airport", "call—taxi". In some non-limiting embodiments of the present technology, the first scenario model 222 may be configured to fill one or more keyword fields based on peripheral information (i.e. information not found within the text representation hypothesis 216 but that is associated with the user 101 or the electronic device 102). For example, the first scenario model 222 may be configured to populate the keyword field "from" with a current location of the user 101.

The first scenario model 222 is then configured to generate a first scenario hypothesis 302 by analyzing the populated one or more keyword fields. In some non-limiting embodiments of the present technology, the first scenario hypothesis 302 corresponds to executing a commit response, which corresponds to an announcement by the electronic device 102 that it will order a taxi from the current location to the airport, but without actually triggering the electronic device 102 to order the taxi.

In response to receiving the text representation hypothesis 216, the second scenario model 224 is configured to analyze text representation hypothesis 216 and populate the one or more keyword fields associated with the smart lamp command. Let us assume that the second scenario model 224 has populated the one or more keyword fields as follows— "action—dim" and "subject—light".

The second scenario model 224 is then configured to generate a second scenario hypothesis 304 by analyzing populated one or more keyword fields. Let us assume for the purpose of this technology that the second scenario hypothesis 304 corresponds to a commit response, which corresponds to an announcement by the electronic device 102 that it will dim the light of the second electronic device 128, but without actually doing so.

In response to receiving the text representation hypothesis 216, the third scenario model 226 is configured to identify words within the text representation hypothesis 216 that is associated with music related commands. Let us assume that the third scenario model 226 has not identified any word that matches its scenario fields.

The third scenario model 226 is then configured to generate a third scenario hypothesis 306 based on the lack of any identified words. In some non-limiting embodiments of the present technology, the third scenario hypothesis 306 is a null response.

Ranking Routine 206

Referring back to FIG. 2, the hypothesis generating routine 204 is configured to transmit a data packet 228 to the ranking routine 206. The data packet 228 comprises an indication of the first scenario hypothesis 302, the second scenario hypothesis 304 and the third scenario hypothesis 306.

In response to receiving the data packet 228, the ranking routine 206 is configured to execute a machine learning algorithm (MLA) 230.

In some non-limiting embodiments of the present technology, the MLA 230 is configured to assign a confidence score to each of the first scenario hypothesis 302, the second scenario hypothesis 304 and the third scenario hypothesis 306. In some non-limiting embodiments of the present technology, the confidence score is indicative of a likelihood of each of the first scenario hypothesis 302, the second scenario hypothesis 304 and the third scenario hypothesis 306 being a correct response to the text representation hypothesis 216. In other words, the MLA 230 is configured to select a winning scenario from the first scenario hypothesis 302, the second scenario hypothesis 304 and the third scenario hypothesis 306. In certain non-limiting embodiments of the present technology, the MLA 230 is configured to select a single winning scenario from the first scenario hypothesis 302, the second scenario hypothesis 304 and the third scenario hypothesis 306. In certain other non-limiting embodiments of the present technology, the MLA 230 is configured to select a set of winning scenarios from the first scenario hypothesis 302, the second scenario hypothesis 304 and the third scenario hypothesis 306. The set of winning scenarios can include two scenarios, or any other number pre-determined by an operator of the MLA 230.

Figure 4:
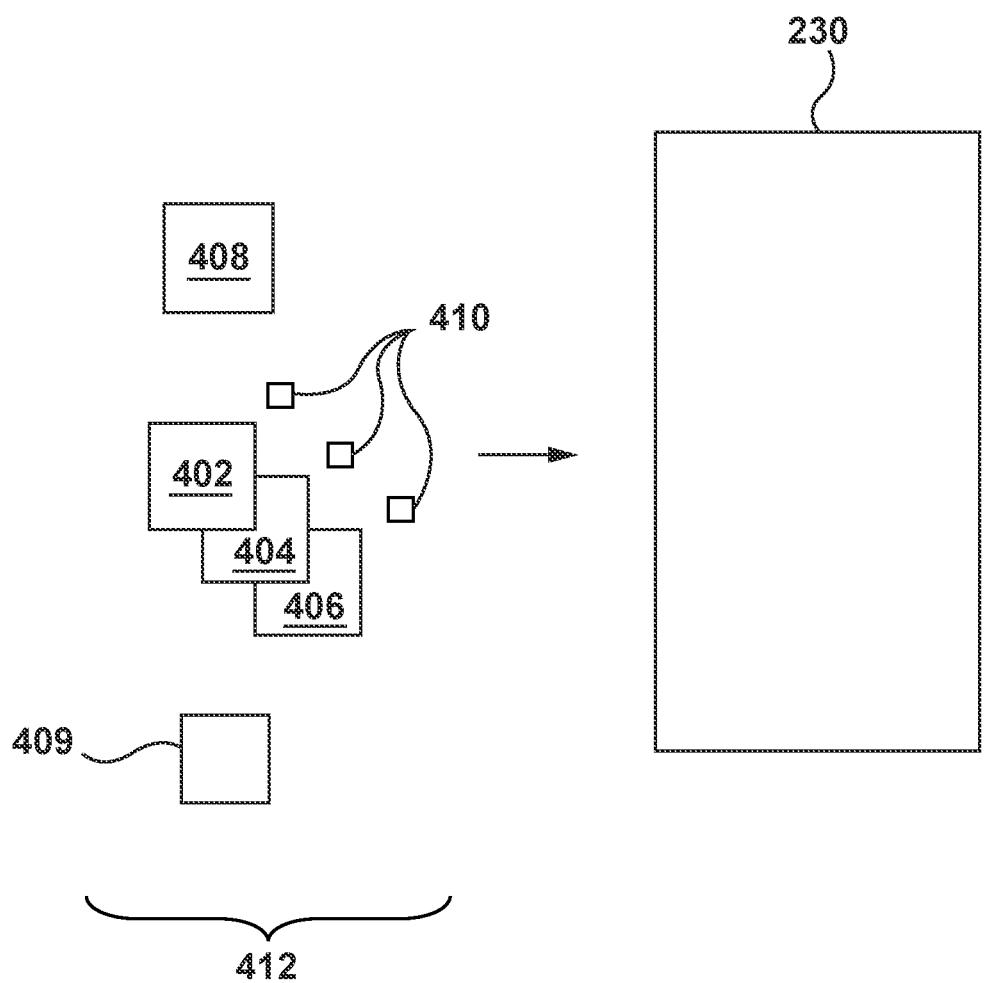
FIG. 4 depicts a schematic illustration of a process of training a machine learning algorithm, executed prior to the process of FIG. 2.

With reference to FIG. 4, there is depicted a diagram of a method for training the MLA 230.

For better understanding the underlying concept of the present technology, it should be understood that the training of the MLA 230 can be broadly separated into a first phase and a second phase. In the first phase, the training input data (discussed below) is generated. In the second phase, the MLA 230 is trained using the training input data. Moreover, although the steps of training the MLA 230 are explained as being executed by the ranking routine 206, it is not limited as such.

In the first phase, one or more training hypotheses (a first training hypothesis 402, a second training hypothesis 404 and a third training hypothesis 406) are generated, in response to a training utterance 408. How the first training hypothesis 402, the second training hypothesis 404 and the third training hypothesis 406 are generated is not limited, and may be generated in a similar manner as described above, by the hypothesis generating routine 204.

For example, if the training utterance 408 corresponds to "Play music by Madonna", the first training hypothesis 402 may correspond to instructions to play a playlist of Madonna, the second training hypothesis 404 may correspond to instructions to play a video of Madonna, and the third training hypothesis 406 may correspond to instruction to do a web search of Madonna.

Needless to say, although only three training hypotheses are illustrated, it is not limited as such. It is contemplated that more or less training hypotheses being generated in response to the training utterance 408.

In addition, in some non-limiting embodiments of the present technology, the ranking routine 206 may receive a set of contextual features 409 associated with a training electronic device (not shown) from which the training utterance 408 was received. Just as an example, the set of contextual features 409 may include contextual features of the training electronic device, such as, for example:

The type of application currently running and/or available in the training electronic device;

The current state of the training electronic device, such as status of the one or more applications currently running (such as the volume level and the like); and The status of any secondary electronic devices coupled to the training electronic device.

Moreover, each of the training hypotheses is assigned with a label 410. The label 410 is indicative of the correct response to the training utterance 408, and may be manually inputted by an administrator or an assessor (who can be a crowd sourced assessor, for example) supervising the training of the MLA 230. Within the context of the non-limiting embodiments of the present technology, the correct response is meant to denote what action the training electronic device needs to execute in response to the training utterance. In this example, the correct answer is which one of the actions selected from the following the training electronic device is to execute: play a playlist of Madonna, play a video of Madonna, and do a web search of Madonna.

For example, assuming that the first training hypothesis 402 corresponds to the correct response, the first training hypothesis 402 is assigned with the label 410 having a label value of "1" and all the remaining training hypotheses are assigned with the label 410 having a label value of "0". In some non-limiting embodiments of the present technology, the assessors assign the label 410 based on a personal perception of the correct answer, conditioned by instructions provided by an operator of the training phase.

Needless to say, although in the present example, the label 410 is implemented as a binary label, it is not limited as such. It is contemplated that the label 410 be implemented as a numerical number within a range (such as 1 to 10), where each of the training hypotheses are assigned a value depending on how appropriate the training hypothesis is vis-a-vis the training utterance.

For example, the first training hypothesis 402 may be assigned with the label 410 having a label value of "1" since it responds to correctly to the training utterance 408. On the other hand, the second training hypothesis 404 (which corresponds to instructions to play a video of Madonna) may be assigned with the label 410 having a label value of "0.5" since it partially responds to the training utterance 408. Finally, the third training hypothesis 406 (which corresponds to instructions to do a web search of Madonna) may be assigned with the label 410 having a label value of "0" since it does not respond to the training utterance 408.

The training utterance 408, the set of contextual features 409, the first training hypothesis 402, the second training hypothesis 404, the third training hypothesis 406 and the corresponding labels together form the training input data 412.

The training input data 412 is transmitted to the MLA 230 for training. In some non-limiting embodiments of the present technology, the MLA 230 is implemented as a classifier implementing a decision-tree type algorithm.

The MLA 230 comprises a training logic to determine a set of features associated with the training input data 412 and/or the training electronic device. Based on the set of features associated with the training input data 412 and/or the training electronic device, the MLA 230 is configured to learn to predict a training confidence score for each of the training hypotheses that is indicative of a respective likelihood of each training hypothesis corresponding to the correct response to the training utterance 408.

Needless to say, although there is depicted only a single instance of the training of the MLA 230, it is done so for ease of illustration. It should be expressly understood that the training of the MLA 230 is done iteratively using a plurality of different training utterances.

Returning to FIG. 2, the explanation on how the confidence score is determined is resumed.

The MLA 230 is configured to assign a confidence score to each of the first scenario hypothesis 302, the second scenario hypothesis 304 and the third scenario hypothesis 306 based on the utterance 212 (which may be separately received by one of the receiving routine 202 or the hypothesis generating routine 204), and a set of contextual features (not shown) which may be received by the electronic device 102 separately.

Figure 5:
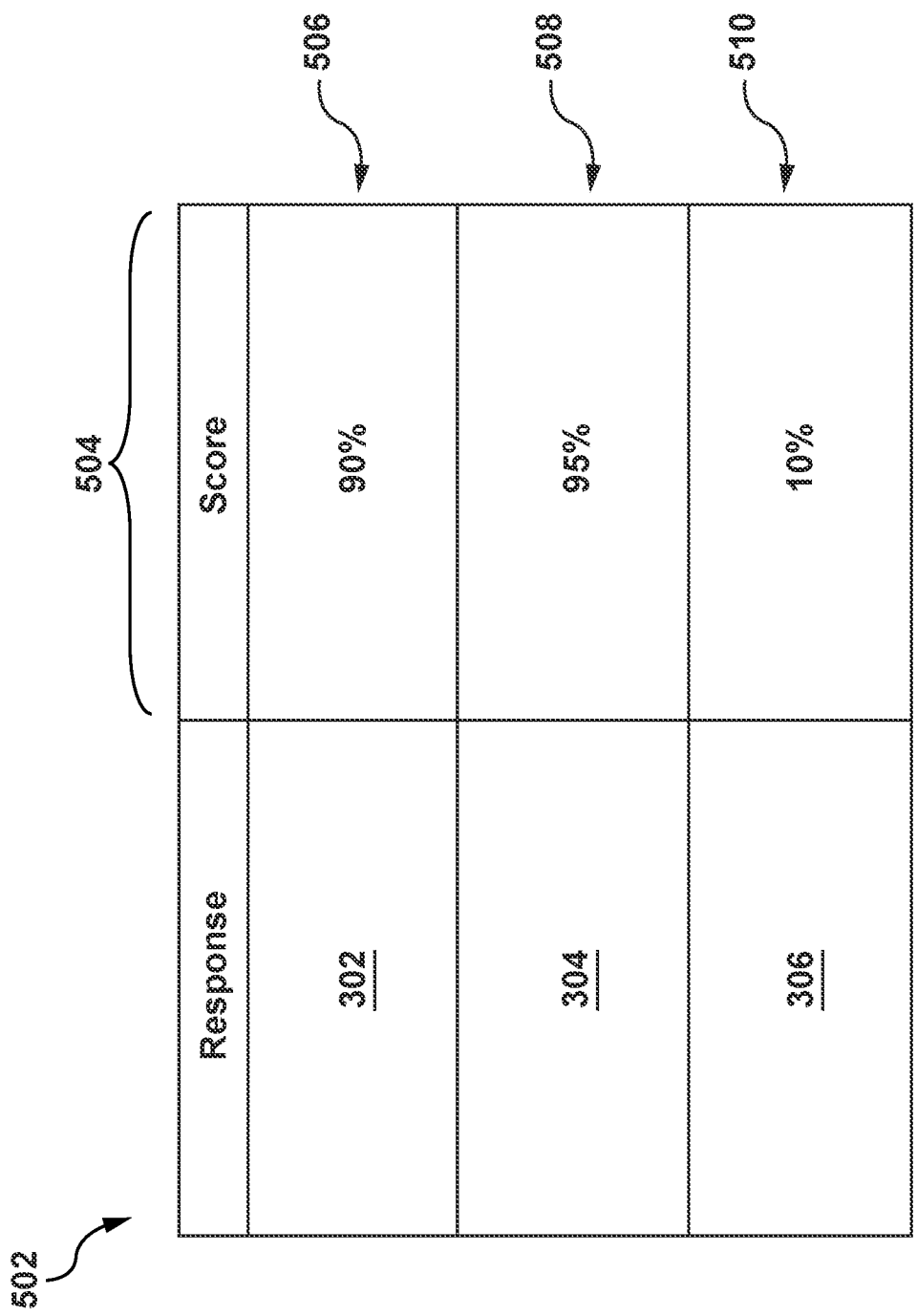
FIG. 5 depicts a table of a set of confidence scores, generated as part of the process of FIG. 2.

With brief reference to FIG. 5, there is provided a non-limiting example of a table 502 storing a set of confidence scores 504 generated by the MLA 230. The set of confidence scores 504 comprises a plurality of confidence score each being associated with a scenario hypothesis.

For example, the MLA 230 has generated a first confidence score 506 that is indicative that the probability of the first scenario hypothesis 302 being a correct response to the utterance 212 is 90%. The MLA 230 has also generated a second confidence score 508 that is indicative that the probability of the second scenario hypothesis 304 being a correct response to the utterance 212 is 95%. The MLA 230 has also generated a third confidence score 510 that is indicative that the probability of the third scenario hypothesis 306 being a correct response to the utterance 212 is 10%. Although in the illustrated example, the confidence score is implemented as a percentage, it is not limited as such, and may for example be implemented in a different range, such as from 1 to 10.

Needless to say, it should be understood that the values provided within the present example is for illustration purposes only, and it should be understood that the values are not meant to represent a specific situation and/or be consistent within the present disclosure.

Now, having determined the set of confidence scores 504, the ranking routine 206 is configured to select one or more winning hypotheses having a confidence score above a predetermined threshold. For example, the ranking routine 206 is configured to select the one or more hypotheses having a confidence score above 90. Needless to say, it is contemplated that the predetermined threshold be different than 90.

In some non-limiting embodiments of the present technology, instead of selecting one or more hypotheses having a confidence score above a predetermined threshold, the ranking routine 206 is configured to determine a number of commands included within the text representation hypothesis 216. How the ranking routine 206 can be configured to determine the number of commands included within the text representation hypothesis 216 is known in the art and will not be described herein. Suffice it to say that the ranking routine 206 may be configured to analyze the presence of verbs within the text representation hypothesis 216 and determine the number of commands.

For example, the ranking routine 206 may determine that within the text representation hypothesis 216, there are two commands ("call taxi to airport" and "dim the light"). As such, the ranking routine 206 is configured to select the two hypotheses with the highest confidence score, namely the first scenario hypothesis 302 and the second scenario hypothesis 304.

Having determined the winning scenarios, the ranking routine 206 is further configured to generate a set of instructions associated with the first scenario hypothesis 302 and the second scenario hypothesis 304 to be transmitted to the electronic device 102.

In some non-limiting embodiments of the present technology, the ranking routine 206 is configured to transmit the first scenario hypothesis 302 to the first scenario model 222 and the second scenario hypothesis 304 to the second scenario model 224 (see FIG. 3), which are each configured to generate a set of instruction. In some non-limiting embodiments of the present technology the ranking routine 206 is configured to instead transmit the text representation hypothesis 216 to the first scenario model 222 and the second scenario model 224.

For example, recalling that the first scenario hypothesis 302 is a commit response, the first scenario model 222 is configured to generate a first set of instructions causing the electronic device 102 (1) announce that a taxi is being ordered from the current location to the airport; and (2) cause one of the one or more service applications 112 (see FIG. 1) to order a taxi accordingly. In some non-limiting embodiments of the present technology, the first scenario model 222 may announce, and then require an additional confirmation by the user 101 prior to causing the one or more service applications 112 to order the taxi. How the announcement is executed by the electronic device 102 is not limited. For example, the first set of instructions may display on the screen of the electronic device 102 or audibly announce the user 101 that a taxi has been ordered. In some non-limiting embodiments of the present embodiments, the first set of instructions further includes instructions to cause the electronic device 102 to provide additional information to the user 101, such as the estimated time of arrival of the taxi, the estimated cost and the like.

In another example, recalling that the second scenario hypothesis 304 is also commit response, the second scenario model 224 is configured to generate a second set of instructions causing the electronic device 102 to (i) announce that the light of the second electronic device 128 is being dimmed; and (2) cause the dimming of the light of the second electronic device 128.

As it is apparent from the above description, it should be understood that the first scenario hypothesis 302 and the second scenario hypothesis 304 are triggered only after the determination that the first scenario hypothesis 302 and the second scenario hypothesis are the winning scenarios by the ranking routine 206.

Alternatively, if one of the winning scenario included a postponed response, the scenario model associated with the winning scenario may be configured to generate a third set of instructions causing the electronic device to launch a side application and process a response to the utterance 212 (such as launching Yandex.Dialog™ and responding to the utterance 212).

Alternatively, if one of the winning scenario included an answer-based response, the associated scenario model may be configured to generate a set of instruction causing the electronic device 102 to provide an answer to the utterance 212. For example, if the utterance 212 corresponds to the "what is the weather today", the set of instruction may cause the electronic device 102 to announce the weather and/or graphically display the weather on the electronic device 102.

The ranking routine 206 is then configured to transmit a data packet 232 to the virtual assistant application 108 (see FIG. 1). The data packet 232 comprises the first set of instructions and the second set of instructions.

In response to receiving the data packet 232, the virtual assistant application 108 is configured to execute the first set of instructions and the second set of instructions included within the data packet 232.

In response to receiving the first set of instructions, the virtual assistant application 108 is configured to access a side service, such as a transportation application (such as Uber™) installed within the electronic device 102, and identify any relevant information associated with the request, such as identifying the estimated time of arrival of the taxi, the estimated cost, the travel time and the like, and request confirmation by the user 101 before calling the taxi.

In response to receiving the second set of instructions, the virtual assistant application 108 is configured to access a side service, such as an application installed within the electronic device 102 that is associated with the second electronic device 128, and transmit instruction to the second electronic device 128 to dim the light.

In some non-limiting embodiments of the present technology, the virtual assistant application 108 is configured to execute the first set of instructions and the second set of instructions simultaneously, or one after another.

Although the above explanation of the ASR application 126 has been made as being executed by the server 120, it is not limited as such. In some non-limiting embodiments of the present technology, it is contemplated that the ASR application 126 be executed within the electronic device 102.

Figure 6:
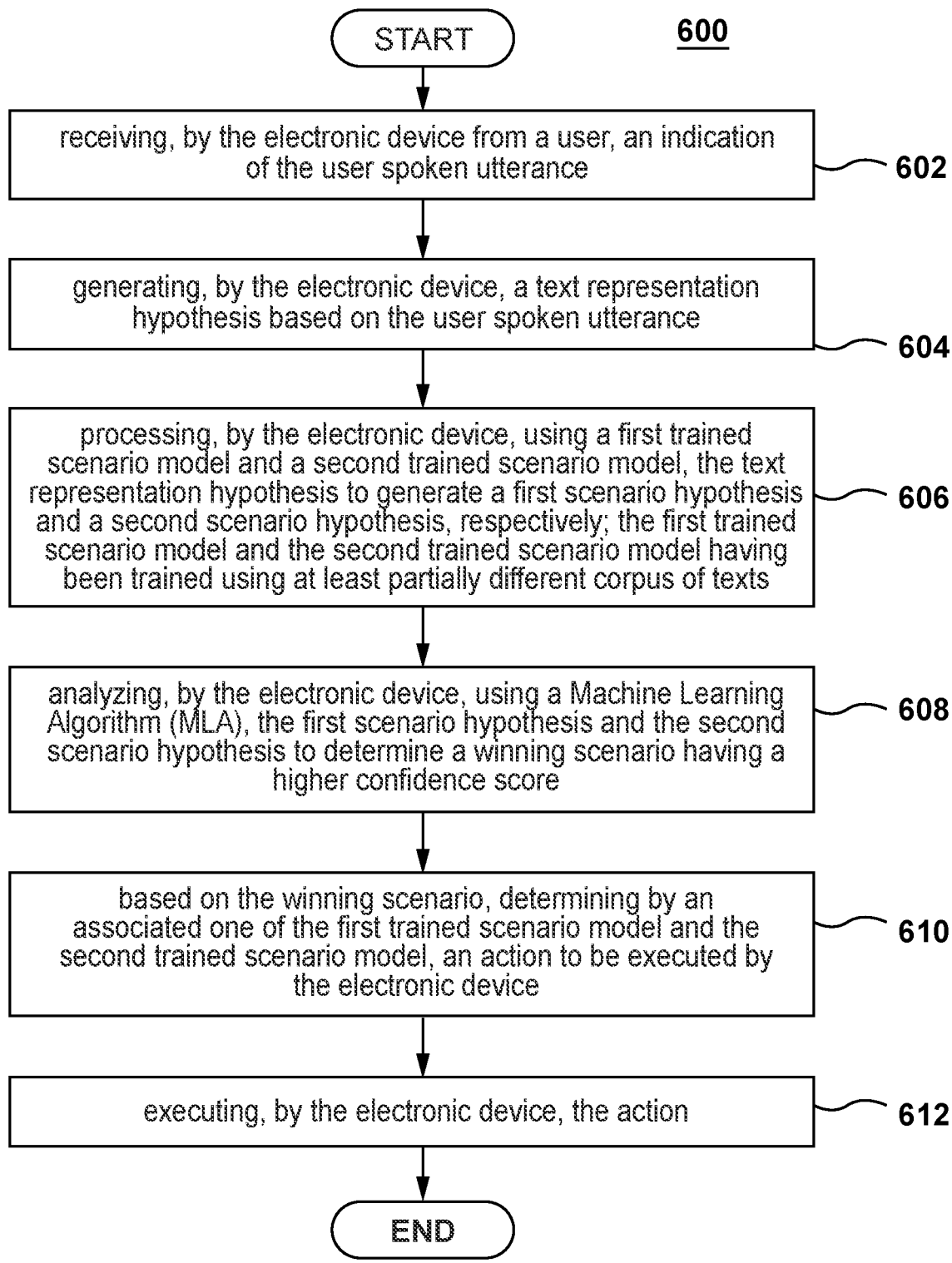
FIG. 6 depicts a block diagram of a flow chart of a method for processing a user-spoken utterance.

Given the architecture and examples provided herein above, it is possible to execute a computer-implemented method for processing a user-spoken utterance. With reference to FIG. 6, there is provided a flow chart of a method 600, the method 600 being executable in accordance with non-limiting embodiments of the present technology. The method 600 can be executed by the server 120 or by the electronic device 102.

Step 602: Receiving, by the Electronic Device from a User, an Indication of the User Spoken Utterance The method 600 starts at step 602, where the receiving routine 202 is configured to receive the data packet 210 from the virtual assistant application 108. The data packet 210 comprises the utterance 212 of the user 101 expressed in natural language.

Step 604: Generating, by the Electronic Device, a Text Representation Hypothesis Based on the User Spoken Utterance At step 604 the receiving routine 202 is configured to execute the NLP algorithm 214 to generate a text representation hypothesis 216 of the utterance 212. The receiving routine 202 is then configured to transmit a data packet 218 to the hypothesis generating routine 204. The data packet 218 comprises the text representation hypothesis 216.

Step 606: Processing, by the Electronic Device, Using a First Trained Scenario Model and a Second Trained Scenario Model, the Text Representation Hypothesis to Generate a First Scenario Hypothesis and a Second Scenario Hypothesis, Respectively; the First Trained Scenario Model and the Second Trained Scenario Model Having Been Trained Using at Least Partially Different Corpus of Texts At step 606, the hypothesis generating routine 204 is configured to input the text representation hypothesis 216 to a plurality of scenario models 220, which comprises at least a first scenario model 222, a second scenario model 224 and a third scenario model 226. Needless to say, the plurality of scenario models 220 may include more than three scenario models, or only two scenario models.

The first scenario model 222 is configured to generate a first scenario hypothesis 302, the second scenario model 224 is configured to generate a second scenario hypothesis 304 and the third scenario model 226 is configured to generate a third scenario hypothesis 306.

The hypothesis generating routine 204 is configured to transmit a data packet 228 to the ranking routine 206. The data packet 228 comprises the first scenario hypothesis 302, the second scenario hypothesis 304 and the third scenario hypothesis 306

Step 608: Analyzing, by the Electronic Device, Using a Machine Learning Algorithm (MLA), the First Scenario Hypothesis and the Second Scenario Hypothesis to Determine a Winning Scenario Having a Higher Confidence Score At step 608, the MLA 230 is configured to assign a confidence score to each of the first scenario hypothesis 302, the second scenario hypothesis 304 and the third scenario hypothesis 306 based on the utterance 212, and a set of contextual features (not shown) which may be received by the electronic device 102 separately.

Step 610: Based on the Winning Scenario, Determining by an Associated One of the First Trained Scenario Model and the Second Trained Scenario Model, an Action to be Executed by the Electronic Device At step 610, the ranking routine 206 is configured to select one or more hypotheses having a confidence score above a predetermined threshold. For example, the ranking routine 206 is configured to select the one or more hypotheses having a confidence score above 90. Needless to say, it is contemplated that the predetermined threshold be different than 90.

The ranking routine 206 is then configured to transmit the one or more hypotheses having a confidence score above a predetermined threshold and generate a respective set of instructions associated with the one or more hypotheses.

Step 612: Executing, by the Electronic Device, the Action

At step 612, the ranking routine 206 is then configured to transmit a data packet 232 to the virtual assistant application 108 (see FIG. 1). Let us assume that the data packet 232 comprises one or more set of instructions.

In response to receiving the data packet 232, the virtual assistant application 108 is configured to execute the one or more set of instructions included within the data packet 232.

The method 600 then terminates or returns to step 602 and await for another new utterance from the electronic device 102.

It should be apparent to those skilled in the art that at least some embodiments of the present technology aim to expand a range of technical solutions for addressing a particular technical problem encountered by the conventional ASR technology, namely determining the correct response of a user spoken utterance.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A computer-implemented method for processing a user spoken utterance, the method comprising:
   training a machine-learning algorithm (MLA) to determine an action in response to the user spoken utterance, the training comprising:
      generating a training set of data including a plurality of training digital objects, a given one of which includes: (i) an indication of a given training user spoken utterance received by a given training electronic device; (ii) a first training scenario hypothesis and a second training scenario hypothesis generated by a first scenario model and a second scenario model, respectively, based on the given training user utterance, the first trained scenario model and the second trained scenario model having been trained using at least partially different corpora of texts; (iii) a label assigned to each one of the first and second scenario hypothesis, the label being indicative of a respective training action to be executed by the given training electronic device in response to the given training user spoken utterance;
      feeding the plurality of training digital objects to the MLA, thereby training the MLA for determining, for in-use scenario hypotheses associated with the user spoken utterance, a respective confidence level indicative of whether a given in-use scenario hypothesis is responsive to the user spoken utterance, the determining comprising:
         receiving, from a user, an indication of the user spoken utterance;
         generating a text representation hypothesis based on the user spoken utterance;
         processing using the first trained scenario model and the second trained scenario model, the text representation hypothesis to generate a first scenario hypothesis and a second scenario hypothesis, respectively;
         executing the MLA to generate a first confidence score for the first scenario hypothesis and a second confidence score for the second scenario hypothesis;
         determining a winning scenario as being one of the first and second scenario hypotheses having a higher confidence score;
         based on the winning scenario, determining an action to be executed by an electronic device associated with the user; and
         causing the electronic device to execute the action.

2. The method of claim 1, wherein
the first trained scenario model and the second scenario models are part of a plurality of trained scenario models, each one of the plurality of trained scenario models having been trained using at least partially different corpus of text.

3. The method of claim 2, wherein the at least partially different corpora of text have been selected based on an intent of an associated one of the plurality of trained scenario models.

4. The method of claim 1, wherein the processing the text representation hypothesis to generate the first scenario hypothesis and the second scenario hypothesis is executed without the causing the electronic device to execute the action.

5. The method of claim 4, wherein the processing the text representation hypothesis to generate the first scenario hypothesis and the second scenario hypothesis is executed by sending the text representation hypothesis to the first trained model scenario model and the second trained scenario model, and receiving the first scenario hypothesis and the second scenario hypothesis in response thereto.

6. The method of claim 5, wherein the receiving a given one of the first scenario hypothesis and the second scenario hypothesis comprises receiving one of:
an answer-based response;
a commit response; and
a postponed response.

7. The method of claim 6, wherein in response to the winning scenario being associated with the answer-based response, the causing comprises causing the electronic device to provide the answer-based response to the user.

8. The method of claim 7, wherein the answer-based response comprises at least one of an audio representative of the answer-based response and a graphical representation of the answer-based response.

9. The method of claim 6, wherein in response to the winning scenario being associated with the one of the commit response and the postponed response, the determining the action comprises re-sending the text representation hypothesis to an associated one of the first trained scenario model and the second trained scenario model.

10. The method of claim 6, wherein response to the winning scenario being associated with the one of the commit response and the postponed response, the determining the action comprises sending an associated one of the first scenario hypothesis and the second scenario hypothesis that is the winning scenario to an associated one of the first trained scenario model and the second trained scenario model.

11. The method of claim 10, wherein the causing comprises causing the electronic device to trigger an application executable by the electronic device.

12. The method of claim 11, further comprising providing to the user an indication of the action to be executed by the application.

13. The method of claim 12, wherein the application is configured to execute a side electronic service.

14. The method of claim 13, wherein the application is configured to trigger operation of an external electronic device.

15. The method of claim 14, wherein the causing is executed in response to the user providing a confirmation of the action.

16. The method of claim 1, wherein the MLA is a classifier.

17. The method of claim 1, wherein the method further comprises receiving an indication of the label from a human assessor.

18. A system for processing a user spoken utterance, the system comprising an electronic device, the electronic device comprising at least one processor and at least one memory comprising executable instructions that, when executed by the at least one processor, cause the system to:
train a machine-learning algorithm (MLA) to determine an action in response to the user spoken utterance, by:
generating a training set of data including a plurality of training digital objects, a given one of which includes: (i) an indication of a given training user spoken utterance received by a given training electronic device; (ii) a first training scenario hypothesis and a second training scenario hypothesis generated by a first scenario model and a second scenario model, respectively, based on the given training user utterance, the first trained scenario model and the second trained scenario model having been trained using at least partially different corpora of texts; (iii) a label assigned to each one of the first and second scenario hypothesis, the label being indicative of a respective training action to be executed by the given training electronic device in response to the given training user spoken utterance; feeding, by the electronic device, the plurality of training digital objects to the MLA, thereby training the MLA for determining, for in-use scenario hypotheses associated with the user spoken utterance, a respective confidence level indicative of whether a given in-use scenario hypothesis is responsive to the user spoken utterance, the determining comprising:
receive, an indication of the user spoken utterance from a user;
generate a text representation hypothesis based on the user spoken utterance;
process, using the first trained scenario model and the second trained scenario model, the text representation hypothesis to generate a first scenario hypothesis and a second scenario hypothesis, respectively;
execute the MLA to generate a first confidence score for the first scenario hypothesis and a second confidence score for the second scenario hypothesis,
determine a winning scenario as being one of the first and second scenario hypotheses having a higher confidence score;
based on the winning scenario, determine an action to be executed by the electronic device; and
execute the action.

* * * * *